United States Patent [19]

Resnick et al.

[11] Patent Number: 5,976,087
[45] Date of Patent: Nov. 2, 1999

[54] METHOD AND APPARATUS FOR CONTROLLING ACOUSTIC SIGNAL BANDWIDTH IN AN ULTRASONIC DIAGNOSTIC IMAGING SYSTEM

[75] Inventors: Jeffrey R. Resnick, Foster City; Gregory R. Bashford, Fremont, both of Calif.

[73] Assignee: Acuson Corporation, Mountain View, Calif.

[21] Appl. No.: 09/047,990

[22] Filed: Mar. 25, 1998

Related U.S. Application Data

[62] Division of application No. 08/759,560, Dec. 4, 1996.

[51] Int. Cl.⁶ .................................................. A61B 8/00
[52] U.S. Cl. .................................................. 600/443
[58] Field of Search .................................. 600/443, 444, 600/447; 13/625, 626

[56] References Cited

U.S. PATENT DOCUMENTS

| | | |
|---|---|---|
| 4,063,549 | 12/1977 | Beretsky et al. ............................ 128/2 |
| 4,141,347 | 2/1979 | Green et al. . |
| 4,182,173 | 1/1980 | Papadofrangakis et al. ............. 73/194 |
| 4,520,671 | 6/1985 | Hardin ..................................... 73/620 |
| 4,737,921 | 4/1988 | Goldwasser et al. . |
| 4,773,425 | 9/1988 | Saitou . |
| 4,783,839 | 11/1988 | Bamber . |
| 4,787,393 | 11/1988 | Fukukita et al. . |
| 4,817,433 | 4/1989 | Sato . |
| 5,007,428 | 4/1991 | Watmough ........................ 128/660.04 |
| 5,109,858 | 5/1992 | Nishiyama et al. . |
| 5,172,103 | 12/1992 | Kita . |
| 5,182,728 | 1/1993 | Shen et al. . |
| 5,396,285 | 3/1995 | Hedberg et al. ......................... 348/163 |
| 5,431,167 | 7/1995 | Savord ................................... 600/443 |
| 5,471,989 | 12/1995 | Roundhill et al. ................. 128/660.04 |
| 5,476,097 | 12/1995 | Robinson . |
| 5,549,111 | 8/1996 | Wright et al. ........................... 600/555 |
| 5,827,188 | 10/1998 | Wright et al. ........................... 600/447 |

FOREIGN PATENT DOCUMENTS

| | | |
|---|---|---|
| 0 116 901 A2 | 8/1984 | European Pat. Off. . |
| 0 486 269 B1 | 4/1996 | European Pat. Off. . |
| 2 616 914 | 12/1988 | France . |
| 54-162881 | 12/1979 | Japan . |
| 57-173043 | 10/1982 | Japan . |
| 58-41538 | 3/1983 | Japan . |
| 59-20155 | 2/1984 | Japan . |
| 60-168440 | 8/1985 | Japan . |
| 61-288847 | 12/1986 | Japan . |
| 62-38144 | 2/1987 | Japan . |
| 62-148656 | 7/1987 | Japan . |
| 63-11137 | 1/1988 | Japan . |
| 63-267342 | 11/1988 | Japan . |
| 63-317138 | 12/1988 | Japan . |
| 64-86947 | 3/1989 | Japan . |
| 1-185251 | 7/1989 | Japan . |
| 2-193655 | 7/1990 | Japan . |
| 2-194496 | 8/1990 | Japan . |
| 3-9738 | 1/1991 | Japan . |
| 3-178644 | 8/1991 | Japan . |
| 4-90748 | 3/1992 | Japan . |
| 4-174658 | 6/1992 | Japan . |
| 6-30930 | 2/1994 | Japan . |
| 6-103364 | 4/1994 | Japan . |
| 2 157 828 | 10/1985 | United Kingdom . |
| 2 177 208 | 1/1987 | United Kingdom . |
| 2 194 149 | 3/1988 | United Kingdom . |
| WO 92/10135 | 6/1992 | WIPO . |

OTHER PUBLICATIONS

Diasonics Spectra System Analysis, Oct. 1993.

H.G. Larsen et al. "An Image Display Algorithm For Use in Real–Time Sector Scanners With Digital Scan Converters". *Ultrasonics Symposium Proceedings.* (1980), vol. 2, pp. 763–765.

Takahisa Okazaki et al. "Diagnostic Ultrasound System". *SSA–100A*. (1987).

Akira Inoue et al. "Whole Body CT Scanner". *TCT–300* (1987).

Isao Baba et al. "Technological Trends of Ultrasound Diagnostic Systems". (1987).

Susumu Matsui et al. "Image Processing Techniques in Nuclear Medicine". (1987).

"Acuson 128XP/10c Computed Sonography System Cardiovascular Applications". (Jun. 1992).

M. Graca Ruano et al. "Cost/Benefit Criterion for Selection of Pulsed Doppler Ultrasound Spectral Mean Frequency and Bandwidth Estimators". *IEEE Transactions on Biomedical Eng'g.* (1993). vol. 40, No. 12.

Valentin Magori. "Ultrasonic Sensors: From Research to Applications". *Siemens Review, R&D Special.* (1994).

K. Okubo et al. "Toshiba SSA–380A". (1994). vol. 49, No. 2.

T. Yamakawa. "Toshiba Dual–Head Digital Gamma Camera". (1994). vol. 49, No. 2.

H. Nakajima. "Toshiba SSA–340A". (1994). vol. 49, No. 8.

A. Wada et al. "Toshiba 64–bit RISC Processor, TC86R4600, and Peripheral Chip Sets" (1994). vol. 49, No. 8.

A. N. Evans Ph.D., et al. "Mode Filtering to Reduce Ultrasound Speckle for Feature Extraction". *IEE Proc. Vis. Images Signal Process.* (Apr. 1995). vol. 142, No. 2.

Ronald H. Silverman, Ph.D. et al. "The Effect of Transducer Bandwidth on Ultrasonic Image Characteristics". *Retina.* (1995). vol. 15, No. 1.

Robin D. Willink et al. "The Effect of Noise and High–Pass Filtering on the Estimation of Mean Blood Velocity Using Wide and Narrow Ultrasound Beams." *IEEE Transactions on Biomedical Eng'g.* (1996). vol. 43, No. 3.

Christopher C. Kuni, "Introduction To Computers & Digital Processing In Medical Imaging", Library Of Congress Cataloging–In–Publication Data, pp. 69–71 (1988).

Christopher C. Kuni, "Introduction To Computers & Digital Processing In Medical Imaging" Year Book Medical Publishers, Inc., pp. 112–122 (1988).

B. Earl Henderson, "PC Based X–Ray Imaging System", SPIE, vol. 914 Medical Imaging II (1988), pp. 1232–1237.

John D. Austin and Tim Van Hook, "Medical Image Processing On An Enhanced Workstation", SPIE vol. 914 Medical Imaging II (1988), pp. 1317–1324.

Bruno Richard, Jean–Claude Roucayrol and Jean Perrin, "A New Digital Scan Processor For Ultrasonic Imaging" Acoustical Imaging, International Symposium, vol. 15, pp. 227–238 (1987).

P.N.T. Wells, "The Present Status Of Ultrasonic Imaging In Medicine", Ultrasonics, vol. 31, No. 5 (1993), pp. 345–352.

F. O. Huck, S. K. Park, D. E. Speray, "Information Density And Efficiency Of Two–Dimensional (2–D) Sampled Imagery", SPIE vol. 310 Image Quality (1981), pp. 36–42.

Jonathan Ophir, Nabil F. Maklad, "Digital Scan Converters In Diagnostic Ultrasound Imaging", Proceedings Of The IEEE, vol. 67, No. 4, Apr. 1979, pp. 654–664.

*Primary Examiner*—Francis J. Jaworski
*Assistant Examiner*—Ali M. Imam
*Attorney, Agent, or Firm*—Brinks Hofer Gilson & Lione

[57] ABSTRACT

An ultrasonic imaging system includes a receive beamformer that generates analog receive signals and a scan converter. A receive signal processing path interconnects the receive beamformer and the scan converter, and this processing path includes both an A/D converter characterized by a selectable sampling rate and at least one filter characterized by at least one filter parameter. The filter parameter is selected as a function of the sampling rate to provide enhanced image quality.

12 Claims, 5 Drawing Sheets

FIG. 3

METHOD AND APPARATUS FOR CONTROLLING ACOUSTIC SIGNAL BANDWIDTH IN AN ULTRASONIC DIAGNOSTIC IMAGING SYSTEM

This application is a division of application Ser. No. 08/759,560, filed Dec. 4, 1996, (pending).

BACKGROUND OF THE INVENTION

The present invention relates to ultrasound diagnostic imaging systems, and in particular to methods and systems for controlling the acoustic signal bandwidth in such systems.

Hedberg U.S. Pat. No. 5,396,285, assigned to the assignee of the present invention, discloses an improved receive signal processing path for a ultrasound diagnostic imaging system. This improved processing path utilizes programmable linear or nonlinear filters to provide an enhanced image for display.

The present invention is directed to improved systems for controlling one or more programmable filters included in the receive signal processing path of such an imaging system.

SUMMARY OF THE INVENTION

This invention relates to an improvement to an ultrasound imaging system of the type comprising an ultrasonic transducer operative to generate receive signals indicative of sensed ultrasonic energy, a receive signal processing path responsive to the receive signal, and a scan converter responsive to the receive signal processing path. According to a first aspect of the invention, the receive signal processing path comprises at least one filter characterized by at least one filter parameter, and means for selecting the filter parameter as a function of the sampling rate of an analog-to-digital (A/D) converter included in the receive signal processing path, or as a function of an azimuthal line density characteristic of the receive signal.

By automatically controlling the filter in response to the sampling rate of the A/D converter or azimuthal line density, signal bandwidth and image quality can be preserved in the face of changes of the A/D sampling rate or the azimuthal line density.

According to another aspect of this invention, a method is provided for processing analog receive signals generated by an ultrasonic transducer of an ultrasound imaging system prior to scan conversion. This method comprises the step of filtering the receive signals in analog or digital form. The response characteristics of one or more filters are modified in response to changes in the sampling rate of an AND converter for the receive signals, or as a function of an azimuthal line density characteristic. In this way, the bandwidth and other spectral response characteristics of the receive signals can be maintained at a desired level in the face of changes in the sampling rate or the azimuthal line density.

BRIEF DESCRIPTION OF THE DRAWINGS

FIG. 3 is a block diagram of the digital azimuthal filter of FIG. 1.

DETAILED DESCRIPTION OF THE PRESENTLY PREFERRED EMBODIMENTS

Figure 1:
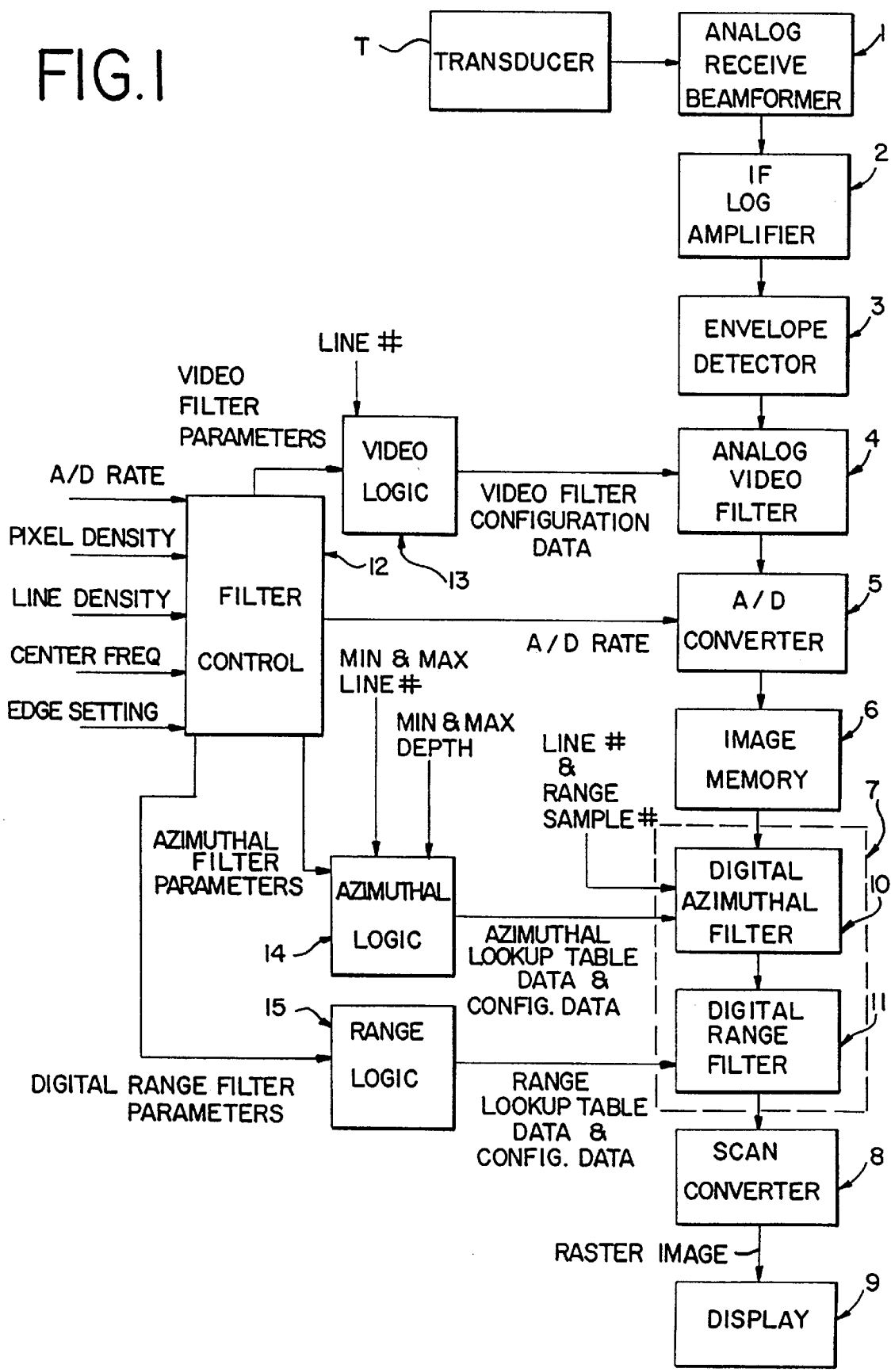
FIG. 1 is a block diagram of an ultrasound imaging system that incorporates a presently preferred embodiment of this invention.

Turning now to the drawings, FIG. 1 shows a block diagram of the receive signal path of an ultrasonic imaging system. An analog receive beamformer 1 receives radio frequency input signals from the elements of a transducer array T, amplifies and converts these signals to an intermediate frequency (IF), coherently sums them together, and filters the output. The resultant receive signal is passed to a log amplifier 2 and envelope detector 3 to generate video output signals for each ultrasound scan line. An analog axial video filter 4 filters each scan line prior to digital sampling of the signal by an analog-to-digital converter 5. The digitized scan line data are stored in a line acquisition image memory 6, which can accumulate one or more complete frames of acoustic image data. A two-dimensional digital filter 7 processes each frame of data. The filtered data are passed to a scan converter 8, which supplies raster output video data for display on a video monitor 9. The processing elements 1–7 between the transducer T and the scan converter 8 form a receive signal processing path.

In the preferred embodiment, the two-dimensional filter 7 includes two components: an FIR azimuthal filter 10, and a FIR range filter 11. Alternatively, the two-dimensional filter 7 can be implemented as a single non-separable, two-dimensional filter, as described in the above-identified Hedberq patent.

The video filter 4 and the 2-D digital filter 7 can be programmed for either linear or nonlinear operation, as described below. Each is also capable of varying in bandwidth as a function of position in the image. In the preferred embodiment, the video filter axial bandwidth depends on the line number of the ultrasound scan line to which the filter is applied, and the azimuthal filter spatial bandwidth varies with both scan line number and range position. In alternative embodiments, position and range information can be used to control the bandwidth of both analog and digital filters.

The filters 4, 10, and 11 are dynamically programmed with configuration data and lookup table data by logic blocks 13, 14, and 15, respectively. These logic blocks are controlled by the filter control block 12, which stores tables of filter parameters that determine the bandwidth of each filter, the degree of nonlinear behavior of each filter, and the variation of bandwidth with line number for the video filter 4 or with line number and range for the azimuthal component of the 2-D filter 7. (To dynamically program the spatial variation of filter 4, the logic block 13 receives the active scan line number as an input. To program the spatial variation of the azimuthal filter 10, the azimuthal filter itself receives line number and range sample number as inputs, and the azimuthal logic block 14 receives the minimum and maximum line number depth as inputs. See FIG. 1.)

During normal usage of the ultrasound system, the operator may change certain front panel controls which result in a change in one or more of the following quantities:

the AND sampling rate, the line density, the horizontal and vertical video pixel densities, the center frequency, the edge enhancement control setting.

The A/D sampling rate and line density affect the sampling grid in the acoustic domain (i.e., in the image data prior to scan conversion). The vertical and horizontal pixel densities determine the sampling grid in the display domain (i.e., in the displayed image after scan conversion). The center frequency and the edge enhancement control setting determine a desired level of lateral and axial resolution and edge enhancement or spatial smoothing. Whenever one or more of the above-listed quantities change, the filter control block 12 may select a new set of filter parameters in order to avoid aliasing during scan conversion and/or to achieve the appropriate lateral and axial bandwidths. The filter control block 12 accomplishes this function with an indexed table that links each set of filter parameters to a particular combination of the above quantities. Further discussion of each of these quantities and of the indexing scheme follows.

A/D Sampling Rate

The A/D sampling rate determines the temporal separation between adjacent samples on a scan line in the acoustic domain. It is important to use the A/D sampling rate as an input to configure the digital FIR range filter 11, because the bandwidth of this filter depends on the sampling rate.

Two constraints are applied in determining the A/D sampling rate. First, the minimum sampling rate is selected to be greater than twice the bandwidth of the output of the video filter 4. Second, the total number of samples collected per scan line is limited such that it does not exceed a limit $N_{max}$ imposed by the finite size of the image memory 6 allocated per scan line. This latter constraint imposes an upper bound on the sampling frequency in MHz of $$c*N_{max}/(2*FOV),$$

where c is the speed of sound in tissue (1.54 mm/usec), and FOV is the depth of the field of view in mm, i.e., the distance in mm between the start and end depths of the displayed image.

In the preferred embodiment, the ultrasound imaging system supports a number of sampling rates $N_r$ which exceed the minimum determined by the output bandwidth of the video filter 4. The sampling rate chosen is the largest rate that is not greater than the upper bound imposed by $N_{max}$. As the user changes the field of view, for example, by changing the maximum depth of the image, by selecting and enlarging a portion of the image, or by deactivating such an enlargement function, the sampling rate may change.

The filter control block 12 assigns an index from 0 to $N_r-1$ to each of the $N_r$ allowed sampling rates.

Line Density

The spacing between adjacent scan lines determines the spatial bandwidth of the azimuthal filter 10. Because the spacing may change with depth or with lateral position for sector or Vector® image formats, the parameters which control the azimuthal filter 10 compensate for these changes in order to preserve consistent spatial bandwidth across the image. For example, in a sector or Vector® format, less azimuthal smoothing (or more sharpening) is needed deeper in the image where scan lines are farther apart than shallower in the image where scan lines are closer together.

In the preferred embodiment, the spacing between scan lines can vary with operator control. Preserving image quality at different line densities will in general require different azimuthal filter parameter sets.

As an example of how line density may change, for some transducers, for which a high frame rate is desired, the ultrasound system may reduce the line density with a full view image while employing a higher line density when the operator selects and enlarges a portion of an image. The system may also reduce line density when the B-mode image is reduced in size to allow room on the screen for a pulsed wave Doppler display, an M-mode display, or other information. In this example, the number of different line densities $N_l$ is 3, and the control block 12 assigns an index from 0 to $N_l-1$ to each line density setting.

In other embodiments, the number of line density settings and the conditions under which line density changes may differ from this example.

Video Pixel Density

The vertical and horizontal video pixel densities, $e_V$ and $e_H$, are the number of video pixels per mm of image in the vertical and horizontal directions, respectively, as measured along the center scan line. Note that this is not the same as the number of pixels per mm of the monitor itself, i.e. distance is measured in the image, not in the physical monitor.

In the axial direction, to avoid aliasing artifacts when scan converting acoustic data along a line at an angle θ with respect to the vertical, the acoustic range data along the line should be bandlimited at a frequency (in MHz) less than $$c*e_V*\cos(\theta)/4.$$

In the lateral direction, the spatial bandwidth prior to scan conversion is determined by the beamwidth and the line spacing. For uniformly spaced vertical scan lines with spacing s (in mm), if the pixel spacing is greater than the line spacing, then scan conversion imposes the need for further restriction of the spatial bandwidth (in wavelengths/scan line) to less than $$s*e_H/2.$$

Similarly, for a sector or Vector® format, if the angle between lines changes in such a way that the increments in sin (θ) are a uniform value Δ, and the pixel spacing is greater than the line spacing, then the lateral spatial bandwidth at depth R should be restricted to $$R*\Delta*e_H/2.$$

If the number of horizontal pixels per scan line exceeds 1, as it often does in deeper portions of Vector® and sector formatted images, then the bandwidth of the azimuthal filter 10 may be expanded to counteract the smoothing imposed by scan conversion interpolation, though care should be taken to avoid excessively increasing the amplitude of image noise.

With these considerations, specific mutually exclusive domains of $e_H$ and $e_V$ are defined in the filter control block 12, and indices from 0 to $N_p-1$ assigned to each of these $N_p$ pixel domains. For example, one pixel domain could be used to store filter parameters appropriate for the following values of $e_H$ and $e_V$:

$$s*e_H<1 \text{ and } 0.6 \text{ MHz}<c*e_V<0.7\text{MHz}$$

If the operator of the ultrasound machine changes the size of all or a portion of the image, or changes the maximum display depth of the image, the pixel density parameters may change, possibly leading to a change in the active pixel domain.

The filter control block assigns an index from 0 to $N_p-1$ to each of the defined pixel domains.

Center Frequency

Transducers can typically be made to operate effectively at several different center frequencies. Often, the transducer bandwidth changes with a change in center frequency. For this reason, for each center frequency, different filter response characteristics may be preferred for the video filter 4 as well as the 2D filter 7. The filter control block 12 assigns each of the $N_f$ receive center frequencies an index from 0 to $N_f-1$.

Edge Enhancement Control Setting

In the preferred embodiment, a control of the front panel is available which provides $N_e$ choices of edge enhancement or smoothing. Personal preferences regarding the degree of edge enhancement or smoothing vary from one operator to another. Moreover, many operators desire an image with more smoothing than is dictated by sampling considerations in either the acoustic or scan converted grid. The filter control block 12 assigns an index from 0 to $N_e-1$ to each edge setting.

Indexing of the Parameter Sets

There are a total of $N_r*N_l*N_p*N_f*N_e$ unique combinations of the filter control quantities discussed above. Each combination is associated in the filter control block 12 with a specific set of filter parameters that determine the bandwidth, nonlinearity, and spatial variation of the video and 2-D filters 4, 7. A specific combination of sampling rate, line skip setting, pixel density, center frequency, and edge enhancement control setting results in one particular combination of indices. For that combination, the control block 12 selects the associated filter parameter set, and each of the filters is configured in a manner appropriate to that combination of indices. As the operator changes front panel controls for the edge enhancement control, center frequency, maximum depth of view, image enlargement, or image size, some or all of the indices may change, a new set of filter parameters may then be selected, and a new filter configuration results.

Those skilled in the art will recognize that the indices for each of the input quantities for the control block 12 need not start from 0, nor need they consist of sequential integers. The only requirement is that each of the allowed input quantities be associated with a unique index.

Video Filter

Figure 2:
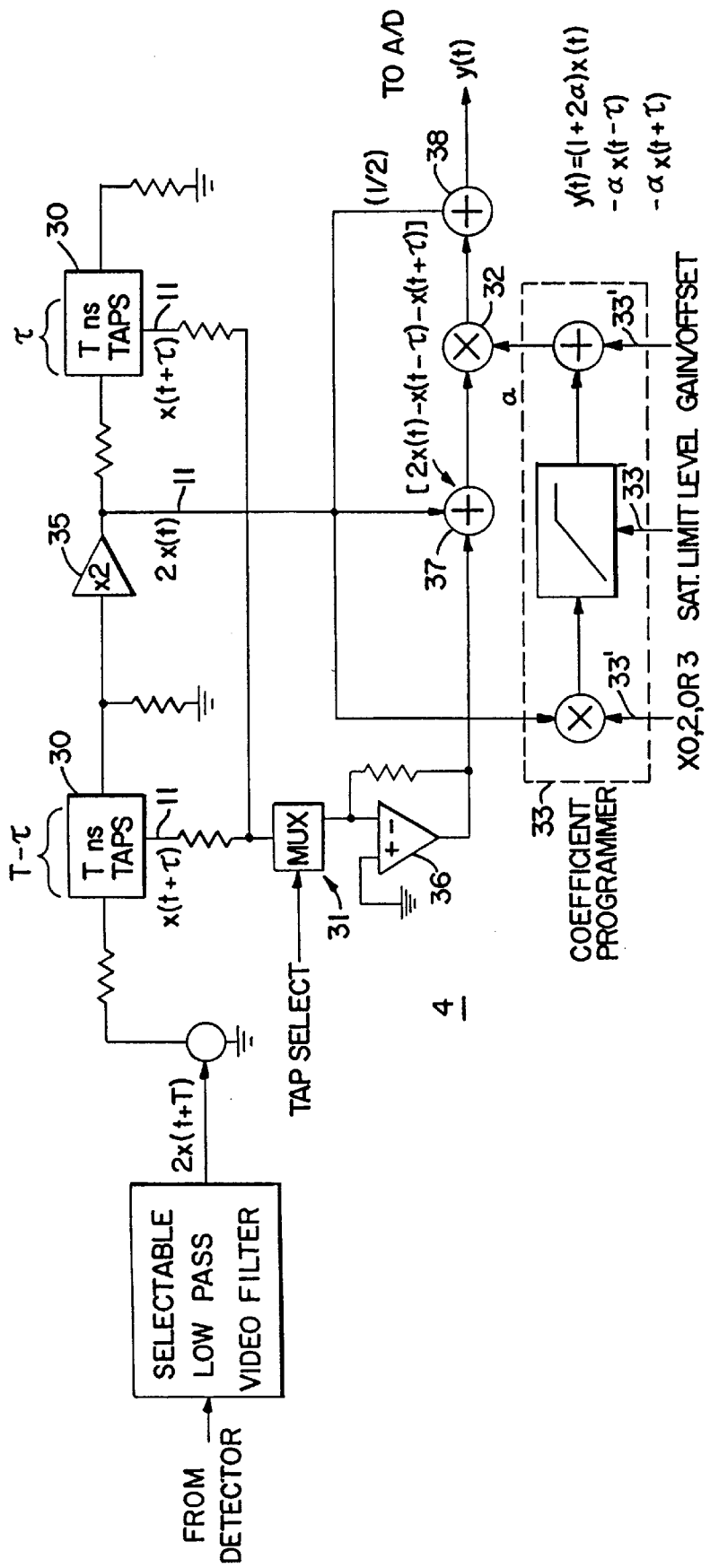
FIG. 2 is a block diagram of the analog video filter of FIG. 1.

The preferred embodiment of the analog video filter 4 is shown in FIG. 2. The filter 4 includes a video low pass filter 29 with three bandwidth options, and a programmable three tap FIR filter that may be configured for either linear nonlinear operation. Hedberg U.S. Pat. No. 5,396,285 provides a more detailed discussion of the video low pass filter 29 (which corresponds to the filter 10 of FIG. 2 of the Hedberg patent) and the elements 30–38 of the three tap FIR filter (which correspond to the similarly numbered elements of FIG. 3 of the Hedberg patent). The Hedberg patent is hereby incorporated by reference in its entirety for its description of these elements, as well as other elements described below.

The filter control block 12 provides the following parameters to the filter 4: low pass filter bandwidth selection, tap spacing, coefficient gain multiplier (constant, X1, X2, or X3), coefficient gain offset, and coefficient gain saturation limit. In the most general implementation, each of these parameters can change with scan line number. In the preferred embodiment the gain saturation limit and gain offset are programmed to vary with line number, such that the filter bandwidth is proportional to the cosine of the scan line angle.

2D Digital Filter, Azimuthal Component

Figure 3:
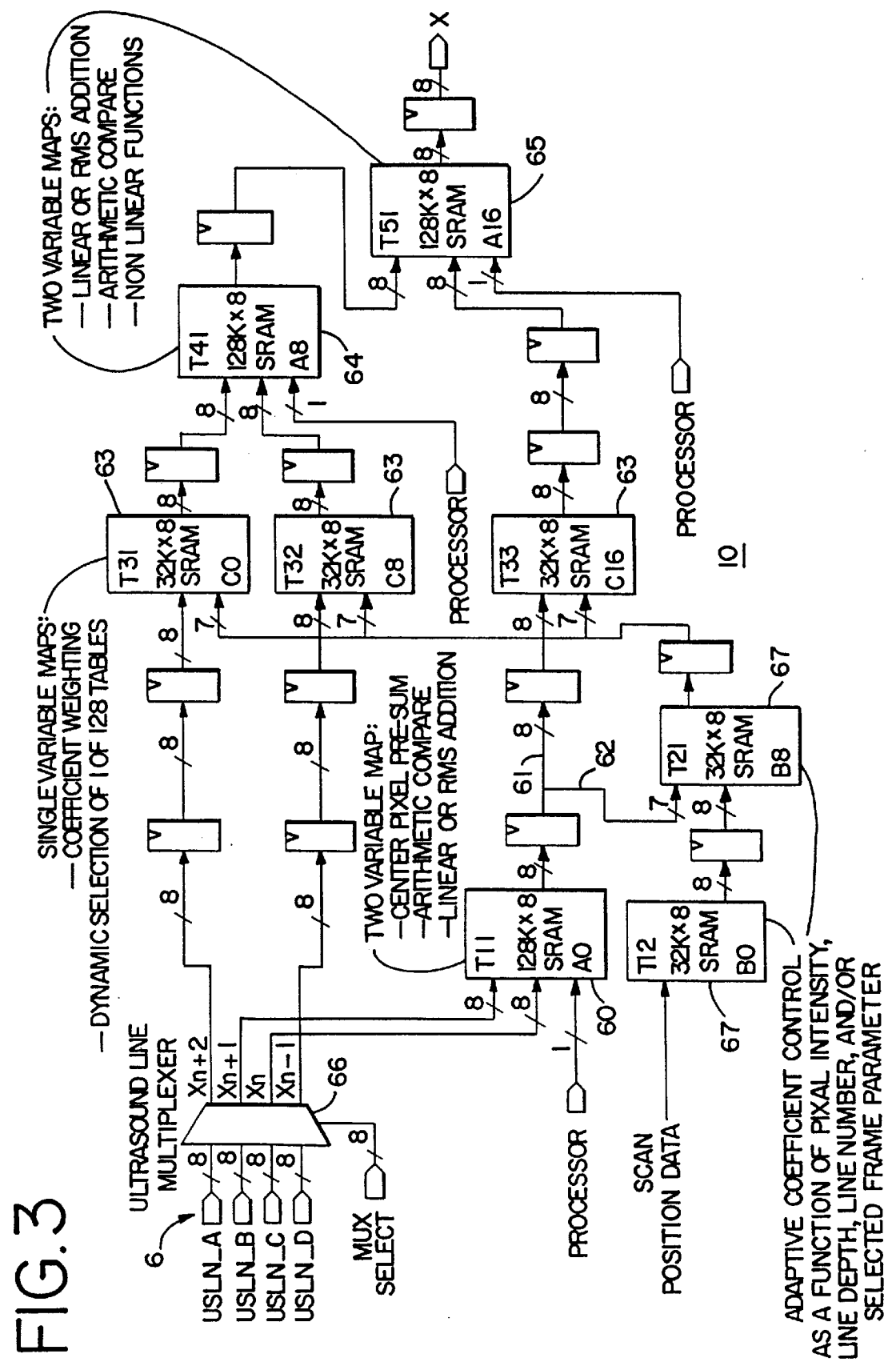

The preferred embodiment of the FIR azimuthal filter 10 is shown in FIG. 3. The azimuthal filter 10 uses lookup tables to provide ready programmability such that the filter response characteristics of the azimuthal filter 10 can readily be changed by the filter logic block 14. The use of look-up tables in the architecture of this filter provides for a broad range of functionality.

In its simplest form, the filter 10 is configured as a linear 4-tap FIR filter, with tap weights $-\alpha, 0.5+\alpha, 0.5+\alpha, +\alpha.$ where $\alpha$ is a real number between $-0.5$ and $+0.5$. (This notation indicates that the data on the two outer lines are multiplied by $-\alpha$, while the data on the two inner lines are multiplied by $0.5+\alpha$.) A 3-tap configuration is easily obtained by placing the two inner taps on the same scan line, which gives tap weights of $-\alpha, 1+2*\alpha, -\alpha.$ To configure the filter 10 for linear operation, the output of lookup table T21 is made proportional to $\alpha$ and passed to lookup tables T31, T32, and T33. Tables T31 and T32 linearly scale the amplitude of the outer lines by a factor equal to $-\alpha$, and their outputs are averaged together by lookup table T41. Data from the inner lines are averaged together by lookup table T11, and scaled (by a factor equal $1+2*\alpha$) by lookup table T33. Inner and outer data are then summed and scaled by lookup table T51 to produce the filtered result.

Range and line number dependence of $\alpha$ is obtained using lookup table T12. In the preferred embodiment, the value of $\alpha$ is specified at each of 8 depths on the center line and on the edge lines. Linear interpolation, first in azimuth, and then in range, fills in the value of $\alpha$ at all other ranges and line numbers. The output of lookup table T12 is passed to lookup table T21.

If the filter is intended to function linearly, then T21 is simply the identity map, i.e., its output is identical to its input from T12. To activate nonlinear behavior, T21 is configured such that the value of $\alpha$ derived from T12 is added to a term that depends on the output of T11, the average inner tap amplitude. In the preferred embodiment, this dependence is given by a piecewise linear curve specified at 16 amplitude levels evenly spaced between 0 and 255 (for 8 bit data).

Another form of nonlinearity can be obtained by configuring T11 to yield, in place of the average of its two input values, the root mean square or the maximum. The same functionality is also possible with T41.

The elements 60–67 of FIG. 3 correspond closely to the similarly numbered elements of FIG. 8 of the above-identified Hedberg patent, and the corresponding portions of the Hedberg patent should be referenced for a more detailed description of these components.

The filter control block 12 specifies the following parameters for control of the azimuthal filter 10: the number of taps (3 or 4), the number of skipped lines between inner and outer taps and between the two inner taps for the 4 tap case, the functionality of T11 and T41 (average, max or rms), up to 8 depths and corresponding values of $\alpha$ for center and edge lines, 16 evenly spaced values of the piecewise linear function that determines the filter's nonlinearity, and the maximum value of $\alpha$ for all possible input amplitudes and spatial locations. The filter control block 12 passes all these parameters to azimuthal filter logic 14, which computes and loads each of the lookup tables.

It will be recognized by those skilled in the art that it is possible to parametrize the azimuthal filter nonlinear and spatial dependence in many other ways without any change in the fundamental functionality of the filter.

2D Digital Filter, Range Component

Figure 4:
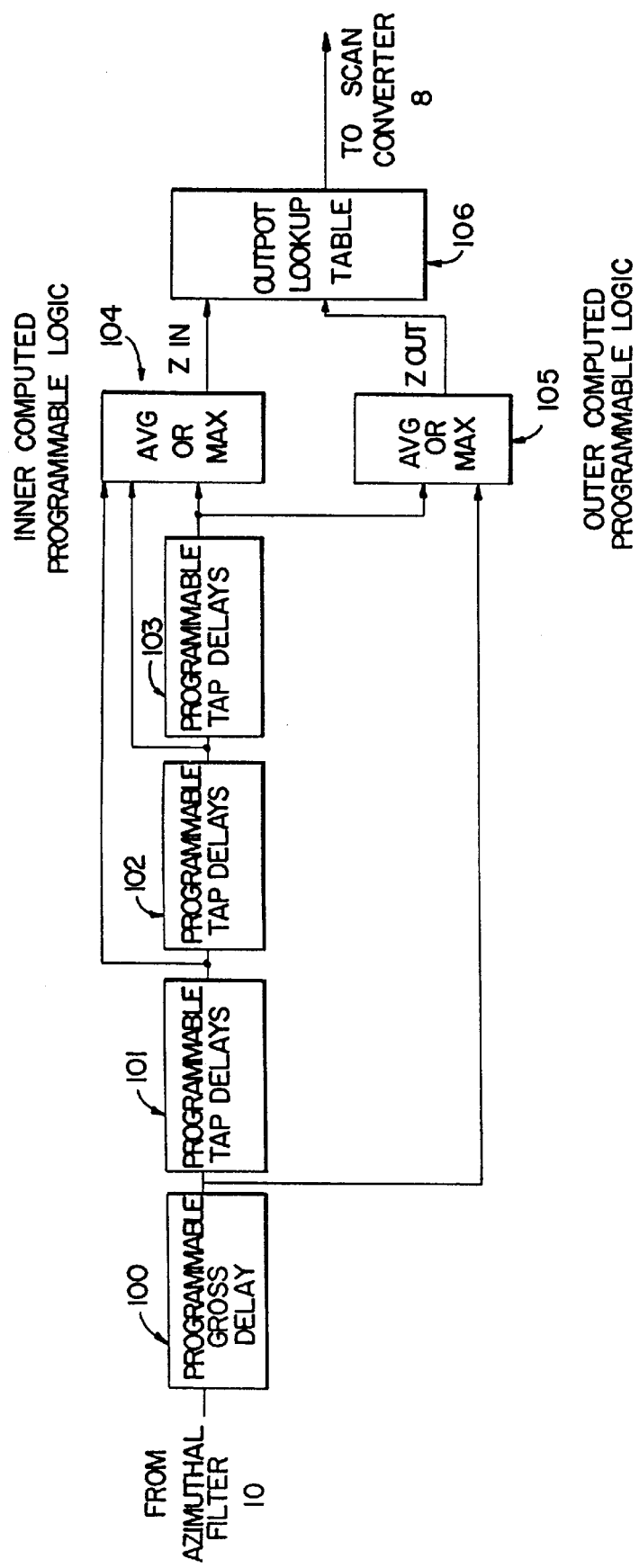
FIG. 4 is a block diagram of the digital axial filter of FIG. 1.

FIG. 4 of the present specification shows a block diagram of the preferred embodiment of the digital range filter 11. Data from the azimuthal filter are clocked through a programmable gross delay block 100 and programmable tap delay blocks 101, 102, 103. The programmable gross delay block 100 permits alignment in time between the digital range filter output and other signal paths. The programmable tap delay blocks 101, 102, 103 permit either 3-tap or 4-tap operation. Data on the outer taps are averaged in the outer computed programmable logic block 105. For four tap operation, data on the inner taps are averaged in the inner computed programmable logic block 104. (For three tap operation, block 104 ignores the input from tap delay 102, and simply passes the input from tap-delay 101 on as its output.) The results from blocks 104 and 105, denoted $Z_{in}$ and $Z_{out}$, respectively, are presented to an output lookup table 106, which weights and sums the contributions from the inner and outer taps.

In its 4-tap configuration, the filter tap weights are $$-\beta, 0.5+\beta, 0.5+\beta, -\beta,$$

and for 3 taps, the filter tap weights are $$-\beta, 1+2*\beta, -\beta.$$

Here the parameter $\beta$ characterizes the response of the range filter 11 in a manner analogous to the role that a plays for the azimuthal filter. To obtain these weights, the output lookup table 106 maps input data $Z_{in}$ and $Z_{out}$ to $$2*((0.5+\beta)*Z_{in}-\beta*Z_{out}).$$

The factor of 2 in this expression results from the fact that $Z_{in}$ and $Z_{out}$ are averages of the inner and outer tap data.

To obtain nonlinear behavior, $\beta$ is itself made dependent on $Z_{in}$. In the preferred embodiment, this dependence consists of a piecewise linear function specified at 16 values of $Z_{in}$ evenly spaced between 0 and 255. This is similar to the parameterization described above for the azimuthal filter nonlinearity.

The outer computed programmable logic block 105 can be configured to take the maximum of the inputs from each outer tap, rather than the average. Similarly, the inner computed programmable logic block 104 can be configured to take the maximum of the inner tap data. This provides a second type of nonlinearity for the range filter 11.

All of the delay blocks 100–103 are programmable as a multiple of a fixed minimum tap delay, which is simply the inverse of the rate at which data is clocked through the filter. For example, with a clock rate of 20 MHz, the delays are programmed in integer multiples of 50 ns. The clock rate is the rate at which data are read out of the image memory 6.

The frequency response of the filter is determined by the sampling rate of the A/D converter 5, not by the clock rate. This is because each clock cycle produces an effective delay (from the standpoint of the digitized data) of one sample at the A/D converter frequency. Therefore, if the A/D converter sampling rate is changed, as it may when depth is changed or an image enlargement function is activated or deactivated, and if the filter configuration remains unchanged, then the frequency response of the filter would scale by the same factor as the A/D converter sampling rate. In order to overcome this potential problem, the control block 12 changes the filter configuration when the A/D sampling rate changes. For example, if the A/D sampling rate is decreased from 10 MHz to 5 MHz while $\beta$ is left unchanged in the digital filter, the filter control block 12 responds by decreasing the number of inner and outer tap delays to one half of the previous value.

The digital range filter 11 is quite similar to the filter shown in FIGS. 4 and 5 of the above-identified Hedberg patent, which should be referenced for a more detailed description of the operation of this filter.

The filter control block 12 specifies the number of taps (3 or 4), the number of unit delays for the gross delay block 100 and inner and outer tap delay blocks 101–103, the mode (average or maximum) of the computed programmable logic blocks 104, 105, and 16 evenly spaced values of the piecewise linear function that determines the nonlinearity of the filter. The filter control block 12 passes all these parameters to range filter logic 15, which computes and loads the output lookup table 106 and configures the delay blocks 100–103 and the inner and outer logic blocks 104, 105.

Other parameterizations are also possible which do not alter the underlying functionality.

EXAMPLE

The spectral responses of the filters 4, 10 and 11 can be varied widely by appropriately programming the respective components. FIG. 12 of the above-identified Hedberg patent illustrates the variety of linear video filter spectral responses that are possible for a particular tap spacing and range of the parameter $\alpha$.

By making a number of such plots in both azimuth and range, and selecting appropriate combinations, it is possible to implement filters which meet desired bandwidth criteria. A simple hypothetical example of a design that ties together the analog and digital range filters 4, 11 follows.

Consider an enlarged image with the following properties:

depth of top of image: 40 mm;

depth of bottom of image: 180 mm;

range of scan angles: 0 to 20 degrees on each side of center line;

number of pixels in image at center line: 220;

center frequency: 2.5 MHz;

$N_{max}$ 2048;

Available A/D rates 20 MHz, 10 MHz, 5 MHz.

The vertical pixel density $e_V$ is 1.57 pixels/mm. The maximum axial frequency displayable without aliasing is $c*e_V*\cos(\theta)/4$, or 0.605 MHz at 0 degrees and 0.569 MHz at 20 degrees. Ideally, all spatial components at frequencies greater than these values (at 0 and 20 degrees, respectively) should be removed by filtering. To illustrate this hypothetical example, these frequencies are treated as the desired 6 db bandwidths at 0 and 20 degrees. Other, more restrictive criteria are possible (12 dB or 20 dB bandwidths, for example), and would result in a further reduction of aliased spectral energy.

The sampling rate of this situation must not exceed $c*N_{max}/(2*FOV)$, which is 11.264 MHz.

Hence, the sampling rate is 10 MHz, and each unit digital tap corresponds to a delay of 100 ns. Configure the 3-tap analog video filter with $\alpha = -0.3$ tap spacing=440 ns gain multiplier=constant (linear filter configuration)

angle dependence vary with $\cos(\theta)$, and the digital axial filter with number of taps=4 number of inner unit tap delays=5 (i.e., 500 ns)
number of outer unit tap delays=5 (i.e., 500 ns)
mode=average (for linear filter configuration)
β=0.25.

Figure 5A:
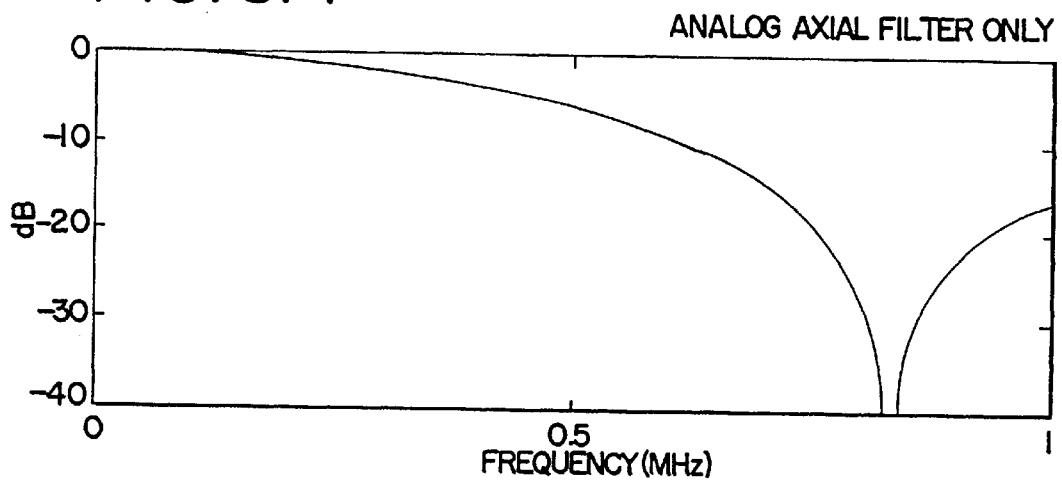
FIGS. 5a, 5b and 5c illustrate the response characteristics of the analog video filter, the digital axial filter, and the combination of the two filters, respectively, in one exemplary mode of operation.
Figure 5B:
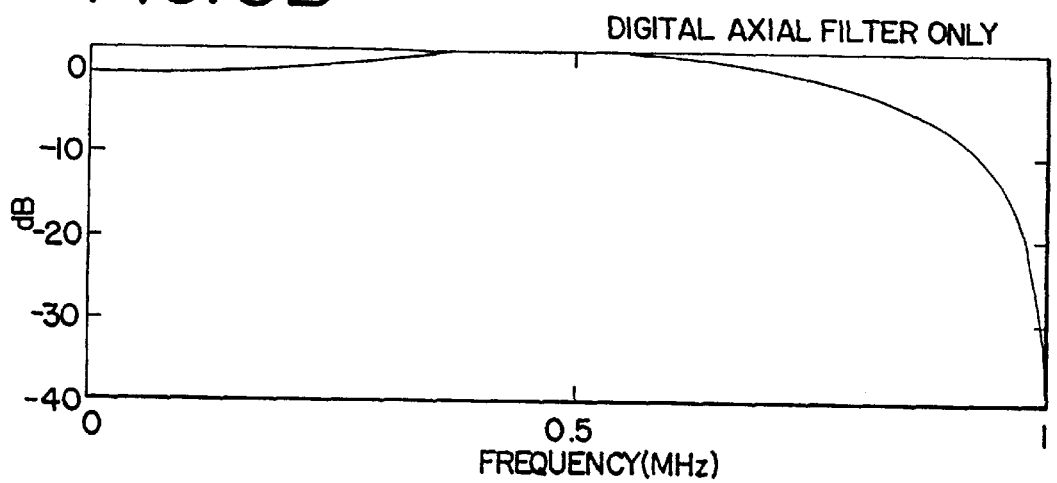
Figure 5C:
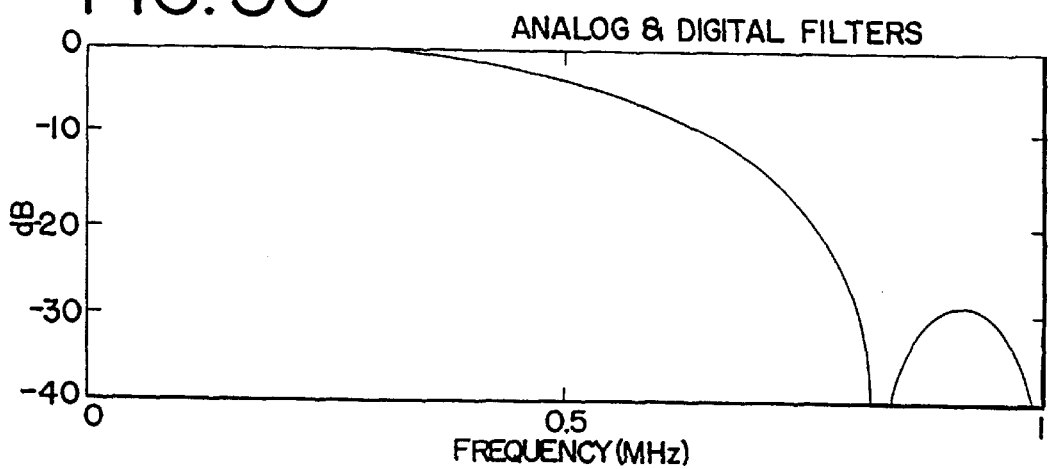

The spectral response for these filters is shown in FIGS. 5a–5c. FIG. 5a shows the response of the analog axial filter 4, FIG. 5b the response of the digital axial filter 11, and FIG. 5c the response of the two in series. From FIG. 5c, the response at 0.605 MHz is down about 6 db, as desired.

An analogous process may be used to construct the azimuthal filter design for the filter 10.

The filter in this simple example was designed solely to reduce aliasing artifacts. Such a filter is suitable for an edge enhancement control setting that yields a relatively "sharp" image. At other positions of the edge enhancement control setting, greater smoothing (lower α and β) would be desirable to suit a wide range of preferences in image aesthetics.

Nonlinear behavior can also be incorporated into the design to produce greater smoothing at lower amplitude to reduce noise and improve contrast resolution, as discussed in the above-identified Hedberg patent.

From the foregoing, it should be apparent that an improved ultrasound imaging system has been described in which the receive signal processing path includes one or more filters and an A/D converter, and wherein at least one filter parameter is selected as a function of the sampling rate of the A/D converter and an azimuthal line density characteristic. In the foregoing example the receive signal processing path includes the A/D converter 5 and the filters 4, 10 and 11. The filter control block 12 operates as a means for selecting the filter parameters as a function of the A/D sampling rate and the azimuthal line density characteristic. The filter parameters that are selected as a function of the sampling rate can control either or both of a range filter 4, 11 or an azimuthal filter 10. The filter can be disposed either upstream of the A/D converter 5 (as is the filter 4) or downstream of the AND converter 5 (as are the filters 10 and 11). The filter parameters may further be selected as a function of the vertical and/or horizontal pixel density of the monitor 9.

It should also be clear that a method has been described for processing analog receive signals. In particular, these receive signals are filtered and converted to digital receive signals. The filter control block 12 modifies the filtering of the receive signals in response to changes in the A/D sampling rate as well as in response to changes in the azimuthal line density.

As used herein, the following terms are intended to have the following meanings, unless indicated otherwise by the context. The term "receive signal" is used broadly to encompass both analog and digital signals that vary in response to ultrasonic energy sensed by a transducer, prior to scan conversion. Thus, signals at all of the various processing stages between the transducer T and the scan converter 8 are considered to be receive signals.

An element is said to operate as a function of a variable when the output of the element varies in accordance with the variable, whether or not the output of the element also varies in accordance with other variables. In many cases an element will provide an output that varies as a function of several separate variables. In this case, the element is said to operate as a function of each of the variables. For example, the filter control block selects filter parameters as a function of the A/D sampling rate, even though the particular filter parameters that are chosen at any given time also vary as a function of the other input signals to the control block discussed above.

The term "filter parameter" is intended broadly to encompass any characteristic of a filter such as filter response, bandwidth, degree of nonlinearity, or any of the other parameters of the filters described above.

It should be understood that many changes and modifications can be made to the preferred embodiment described above. For example, any appropriate analog or digital filter can be substituted for the various filters described above. These filters can be implemented in any suitable technology, and digital filters are not limited to filters utilizing the lookup table techniques described above. In the simplest case, there may simply be several parallel filters that can be switched into or out of the processing path. This invention is not limited to use with FIR filters, but can readily be adapted for any desired type of filter.

Furthermore, the filter control block may use any suitable technology to select filter parameters as a function of appropriate inputs. In the simplest case, the filter control block can control switches that route the receive signals to the filters having the desired properties.

Additionally, this invention can readily be adapted for use in ultrasonic image systems which employ a digital beamformer, and which place the A/D converter upstream of the beamformer in the receive signal processing path.

It is therefore intended that the foregoing detailed description be regarded as illustrative rather than limiting, and that it be understood that it is only the following claims, including all equivalents, which are intended to define the scope of this invention.

We claims:

1. In an ultrasound imaging system comprising an ultrasonic transducer operative to generate receive signals indicative of sensed ultrasonic energy, a receive signal processing path responsive to the receive signals, and a scan converter responsive to the receive signal processing path, the improvement wherein said receive signal processing path comprises:
   an analog detector;
   an A/D converter characterized by a selectable sampling rate and operatively connected to an output of the analog detector;
   at least one filter characterized by at least one filter parameter; and
   means for selecting the at least one filter parameter as a function of the sampling rate.

2. The invention of claim 1 wherein the filter comprises a range filter.

3. The invention of claim 1 wherein the filter comprises an azimuthal filter.

4. The invention of claim 1 wherein the filter is disposed upstream of the AND converter in the receive signal processing path.

5. The invention of claim 1 wherein the filter is disposed downstream of the A/D converter in the receive signal processing path.

6. The invention of claim 1 wherein the imaging system further comprises a display responsive to an output signal from the scan converter wherein said display is characterized by a pixel density, and wherein the selection means further selects the filter parameter as a function of the pixel density.

7. A method for processing analog receive signals generated by an ultrasonic transducer of an ultrasonic imaging system prior to scan conversion, said method comprising the following steps:
   (a) generating analog video signals with an analog detector;

(b) converting the analog video signals to digital receive signals at a selected sampling rate;

(c) filtering at least one of the analog video signals and the digital receive signals;

(d) modifying the filtering step (b) in response to a change in the sampling rate; and (e) applying a filtered signal responsive to the filtering step (b) to a scan converter.

8. The method of claim 7 wherein the filtering step comprises range filtering.

9. The method of claim 7 wherein the filtering step comprises azimuthal filtering.

10. The invention of claim 7 wherein the converting step precedes the filtering step in a receive signal processing path.

11. The invention of claim 7 wherein the filtering step precedes the converting step in a receive signal processing path.

12. The invention of claim 7 wherein the modifying step further comprises the step of modifying the filtering step in response to a pixel density characteristic of the ultrasonic imaging system.

* * * * *

UNITED STATES PATENT AND TRADEMARK OFFICE
CERTIFICATE OF CORRECTION

PATENT NO.    : 5,976,087
DATED         : November 2, 1999
INVENTOR(S)   : Jeffrey R. Resnick et al.

It is certified that error appears in the above-identified patent and that said Letters Patent is hereby corrected as shown below:

Column 1,
Line 50, please change "AND" to --A/D --.

Column 2,
Line 62, please change "AND" to --A/D --.

Column 3,
Line 46, please change "0to" to -- 0 to --.

Column 5,
Line 44, please insert -- or -- before "nonlinear".

Column 6,
Line 7, please change "$\alpha, 0.5+\alpha, 0.5+\alpha, +\alpha$" to --- $\alpha, 0.5+\alpha, 0.5+\alpha, -\alpha$ --.
Line 60, please change "of a" to -- of $\alpha$--.

UNITED STATES PATENT AND TRADEMARK OFFICE
CERTIFICATE OF CORRECTION

PATENT NO. : 5,976,087
DATED : November 2, 1999
INVENTOR(S) : Jeffrey R. Resnick et al.

It is certified that error appears in the above-identified patent and that said Letters Patent is hereby corrected as shown below:

Column 7,
Line 29, please change "that a" to -- that $\alpha$ --.

Column 9,
Line 37, please change "AND" to --A/D--.

Column 10,
Line 51, please change "AND" to -- A/D --.

Claim 6,
Line 4, please change "selection" to -- selecting --.

Signed and Sealed this

Fourteenth Day of August, 2001

*Attest:*

*Attesting Officer*

NICHOLAS P. GODICI
*Acting Director of the United States Patent and Trademark Office*